(12) United States Patent
Groves et al.

(10) Patent No.: US 7,257,111 B2
(45) Date of Patent: Aug. 14, 2007

(54) METHOD AND SYSTEM OF MANAGING A CALL IN A TELECOMMUNICATION SYSTEM

(75) Inventors: Christian Groves, Victoria (AU); Ian Rytina, Victoria (AU); Phil Hodges, Victoria (AU); Juan Noguera-Rodriguez, Albacete (ES); Fredrik Åberg, Kyrkslätt (FI); John Kerr, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 539 days.

(21) Appl. No.: 10/491,868

(22) PCT Filed: Oct. 8, 2001

(86) PCT No.: PCT/IB01/01857

§ 371 (c)(1),
(2), (4) Date: Aug. 11, 2004

(87) PCT Pub. No.: WO03/032655

PCT Pub. Date: Apr. 17, 2003

(65) Prior Publication Data
US 2004/0258045 A1    Dec. 23, 2004

(51) Int. Cl.
*H04L 12/66* (2006.01)
(52) U.S. Cl. .................. 370/352; 370/384; 370/395.43; 370/410
(58) Field of Classification Search ........ 370/352–360, 370/384–385, 396, 398, 395.21, 395.43, 370/395.5, 395.51, 400–401, 408, 410

See application file for complete search history.

(56) References Cited

U.S. PATENT DOCUMENTS

| 6,671,367 B1* | 12/2003 | Graf et al. ................... 379/229 |
| 6,754,180 B1* | 6/2004 | Christie ....................... 370/236 |
| 2003/0118009 A1* | 6/2003 | Hoffmann .................... 370/352 |
| 2003/0227908 A1* | 12/2003 | Scoggins et al. ............ 370/352 |
| 2004/0101125 A1* | 5/2004 | Graf et al. ................... 379/229 |

FOREIGN PATENT DOCUMENTS

WO    WO 0070885    11/2000

OTHER PUBLICATIONS

Freundlich G: Draft recommendation H.248 (clean text). ITU-Telecommunication Standardization Sector TD-XX, Study Group 16, Rapporteur Q 14/16, Jun. 15, 2000, pp. 1-54, XP002902498.

* cited by examiner

Primary Examiner—Binh K. Tieu (57) ABSTRACT

The present invention relates generally to telecommunication services and, in particular, to a system and method of managing a call, particularly with regard to a modification to bearer characteristics. In one aspect the invention provides a method and system of managing a call in a telecommunication system, the telecommunication system including a network having at least one call controller effecting a call control function and at least one bearer controller effecting a bearer control function, the call controller and the bearer controller separated by a vertical control protocol interface, including providing in at least one message, communicated within the telecommunication system, an indication of the capability of the at least one bearer controller to modify a characteristic of a bearer; and receiving and storing said indication in the at least one call controller. In another aspect the invention provides a media gateway controller being operable to request indications and to receive indications from at least one media gateway of the capability of the at least one media gateway to modify a characteristic of a bearer established by the at least media gateway. In a preferred embodiment the invention provides a media gateway controller operable to receive requests for an indication of the capability of the at least one media gateway to modify a characteristic of a bearer established by the media gateway.

19 Claims, 7 Drawing Sheets

METHOD AND SYSTEM OF MANAGING A CALL IN A TELECOMMUNICATION SYSTEM

FIELD OF INVENTION

The present invention relates generally to telecommunication services and, in particular, to a system and method of managing a call, particularly with regard to a modification to bearer characteristics.

BACKGROUND OF INVENTION

There has been a recent trend toward telecommunication network architectures having switching nodes decomposed into call control functionality and bearer control functionality. It will be recognised by those skilled in the art that various call control functions and bearer control functions are known, and those functions may be effected by computer software programs residing within one or more telecommunication network nodes. With the decomposition of switching nodes into the call control functionality and the bearer control functionality, a vertical control protocol is required for communication between the respective call control and bearer control functions. An example vertical control protocol is the Media Gateway Control Protocol which enables external control and management of Media Gateways by Media Gateway Controllers. Media Gateway Control Protocol messages convey the control and management information between the MGC and the MG. MGs typically operate at the edge of multi-service packet networks and examples of MG devices include voice over IP Gateways, voice over ATM Gateways, modem banks, cable modems and set top boxes. The call control and bearer control functions are equally applicable to a situation where call control function resides within a Media Gateway Controller (MGC) or a Call Serving Function such as CSF, CSM, or CSN, and bearer control function resides within a Media Gateway (MG) or a Bearer Interworking Function such as BIWF, BCF, or BCU.

It will also be recognised by those skilled in the art that a bearer is a connection that carries the user plane information of a call. For example, a bearer may be an ATM (Asynchronous Transfer Mode) connection carrying a voice call or an IP (Internet Protocol) connection carrying a data call. In the instance of a decomposed switching node, the bearer control function manages the establishment, modification and release of physical bearers for a call. At the time of call establishment, the call control function requests the bearer control function to establish a call using bearers with characteristics that satisfy the requirements of the call. Bearer characteristics relate to the physical characteristics of the bearer, for example, bandwidth, packetisation, packet size, coding type, or framing.

At various times, a modification to the characteristics of the bearers in an established call connection may be required or requested. However, the bearer control function does not generally support bearer modification signalling and in the event that bearer modification signalling is supported, the call control function is generally unaware of this capability. In this respect, the capability of the bearer control function refers to the capability of the bearer control protocol associated with a bearer. For example, whether the bearer may have its characteristics modified or whether it has release procedures depends upon the capabilities of the associated bearer control function. For whatever reason, if a request to modify the characteristics of a bearer cannot be accommodated by the associated bearer control function, an error message is typically sent from that entity effecting the bearer control function to the entity effecting the call control function indicating that the request cannot be satisfied.

In existing systems, an error message in response to a request from a call control function to modify the characteristics of a bearer typically does not indicate the precise reason for the error. In some instances, the bearer control function may support a modification signalling protocol but the error message may be sent for another reason such as congestion.

Upon receiving an error message from an entity effecting a bearer control function, the call control function may attempt to satisfy a modification request by seeking to establish an alternative bearer connection with alternate bearers having appropriate characteristics.

However, the time delay associated with the process described above in attempting to satisfy a request to modify the characteristics of the bearers in an established call connection is significant and substantially increases the risk of a timeout, which causes the existing call connection to be dropped, as a result of the modification request not being satisfied within time constraints. Further examples of this problem are dropped or delayed packets, producing silences or clicking that may be perceived in a call. All these effects contribute to an unsatisfactory performance of the network.

As a result, it will be recognised by those skilled in the art that the call control function cannot manage a smooth and efficient modification to bearer characteristics for an established call connection with a reasonable probability of achieving the modification within required time constraints.

It is an object of the present invention to ameliorate or overcome one or more disadvantages of the prior art.

It is another object of the present invention to provide an improved system and method of responding to requests for a modification to bearer characteristics such that the improvement enables a determination as to the ability to satisfy the request to be ascertained and/or effected with greater efficiency as compared with existing systems and methods.

SUMMARY OF INVENTION

In one aspect, the present invention provides a method of managing a call in a telecommunication system, the system including a network having at least one call controller effecting a call control function and at least one bearer controller effecting a bearer control function, the at least one call controller and the at least one bearer controller being separated by a vertical control protocol interface, the method including the steps of:

providing in at least one message, communicated within the telecommunication system from the at least one bearer controller to the at least one call controller, an indication of the capability of the at least one bearer controller to modify a characteristic of a bearer; and storing said indication in the at least one call controller; and checking said stored indication when a call control message is received by the at least one call controller indicating that the characteristic of the bearer should be modified to determine whether the characteristic of the bearer can be modified.

Preferably, the indication relates to the capability of the bearer controller to modify a characteristic of a bearer during the active phrase of a call. The active phase of a call being the period of a call after a connection has been established between communicating entities and prior to a release of the call or its disconnection. The message may comprise a media gateway control protocol message.

In one embodiment, the message includes an error code, the error code indicating the lack of the capability of the bearer controller to modify a characteristic of a bearer. In another embodiment, the message includes a property defined in a protocol extension package and in a further embodiment, the message is invoked by an event defined in a protocol extension package. A protocol extension package is a concept that allows an extension to an existing telecommunications protocol by including new information elements of the protocol. The new information elements may be defined in separate protocol documentation. The new information elements may be identified with a package identity and information element identity, that is, a property identity. For example, the H.248 protocol is a vertical control protocol that includes packages definition. An event is a trigger, defined within a package, that, for example, an MGC sets in an MG, to instruct the MG to notify the MGC when a given event has occurred.

In a preferred embodiment, the message may be provided at any time and in particular may be provided during call establishment or during the active phase of a call.

In a preferred embodiment, the message may be provided as part of a call control signalling procedure, the call control signalling procedure including a request for bearer establishment. Preferably, the message may be a Radio Access Network control message. A Radio Access Network control message may comprise a control message which conveys control and management information between a Radio Network Controller (RNC) and an MGC residing in a Mobile Switching Centre (MSC). An example in which such a Radio Access Network control message is suited is a $3^{rd}$ Generation Universal Mobile Telephone System (UMTS) which may include a Core Network (CN) and a UMTS Radio Access Network (UTRAN) where the CN is decomposed into an MSC, including the MGC function and an MG. Bearer connections are established, in this example, between the MG and the RNC in the Iu interface of the UTRAN.

During an active phase of a call, a request to modify an existing bearer characteristic may be received by a call controller. In this instance, the method of the present invention may also include the further steps of:

retrieving indications, for a bearer controller of the existing call, as to the capability of that bearer controller to modify a characteristic of a bearer and in an attempt to satisfy the request, when the bearer controller includes a capability of bearer characteristic modification signalling, invoking a modification of a bearer characteristic of the existing bearer;

when the bearer controller does not include a capability of bearer characteristic modification signalling, invoking establishment of an alternative bearer having requested bearer characteristics. In the event that a modification request cannot be satisfied, in an embodiment of invention, the method of the present invention further includes the step of communicating a message to reject the modification request.

In another aspect, the present invention provides a telecommunication system including a network having at least one call controller effecting a call control function and at least one bearer controller effecting a bearer control function, the call controller and the bearer controller separated by a vertical control protocol interface, said system being operable to acquire information, from at least one message communicated within said system, relating to the capability of the at least one bearer controller to modify a characteristic of a bearer during an active phase of a call, the system also being operable to receive a request to modify a bearer characteristic during an active phase of a call, said system including:

a first means for retrieving said acquired information to determine whether the request can be satisfied;

a second means for modifying a bearer characteristic of an existing bearer when the at least one bearer controller includes a capability of bearer characteristic modification signalling; and a third means for selecting at least one of a plurality of bearers having requested bearer characteristics when the at least one bearer controller does not include a capability of bearer characteristic modification signalling;

wherein upon determination by the first means that a request can be satisfied, the second and third means are used to effect the request.

In yet another aspect, the present invention provides a media gateway controller being operable to:

request, receive, and store indications from at least one media gateway of the capability of the at least one media gateway to modify a characteristic of a bearer established by the at least one media gateway;

receive a call control message indicating that the characteristic of the bearer should be modified; and check said stored indication to determine whether the characteristic of the bearer can be modified.

The media gateway controller may also be operable to receive requests for an indication of the capability of the media gateways to modify a characteristic of a bearer established by the media gateways. In a preferred embodiment, the indication relates to the capability of the media gateways to modify a characteristic of a bearer during the active phase of a call.

In essence, the invention stems from the realisation that the efficiency and effectiveness of the call control function in managing calls can be significantly improved by providing the call control function with an indication of the capability of the bearer control function to modify a characteristic of a bearer.

A significant advantage results from providing an indication of the capability of a bearer control function to modify a bearer characteristic and receiving and storing this indication within the call control function. For example, in the event that bearer characteristics need to be modified, the call control function is able to assess the ability to satisfy such a requirement based upon information presently available to the call control function. In 3GPP networks a modification to bearer characteristics such as the alternate speech/fax functionality is typically requested. Having the call control function provided with an indication of the bearer control function's capability to modify a bearer characteristic such as the speech/fax characteristic, provides the call control function with the ability to manage such modifications to bearer characteristics at the call control level. More effective and efficient management of requests for bearer characteristic modification should reduce the likelihood of calls being dropped and hence provide an overall improvement to network performance.

BRIEF DESCRIPTION OF DRAWINGS

These and other features and advantages of one or more preferred embodiments of the present invention will be readily apparent to one of ordinary skill in the art from the following written description, used in conjunction with the attached drawings, in which.

DESCRIPTION OF PREFERRED EMBODIMENTS

Figure 1:
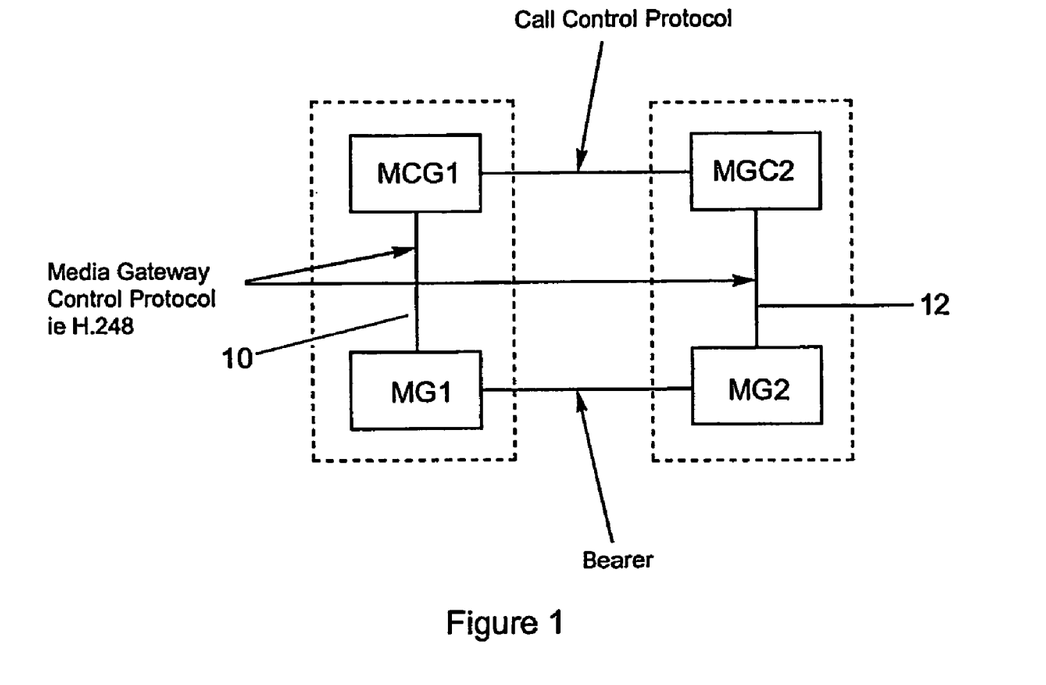
FIG. 1 provides a diagrammatic illustration of a decomposed switching node separated into a media gateway controller and a media gateway.

With reference to FIG. 1, a diagrammatic illustration of a decomposed switching node that is separated into a media gateway controller and a media gateway is provided. In the instance of FIG. 1, there are two entities effecting call control functions namely, media gateway controllers MGC1 and MGC2, and two entities effecting bearer control functions namely, media gateways MG1 and MG2. Also illustrated in FIG. 1 is a bearer residing between the two media gateways MG1 and MG2 and links 10,12 between the respective media gateway controllers and their media gateways which provide for communication therebetween in accordance with a vertical control protocol such as the Media Gateway Control Protocol or H.248.

Figure 2:
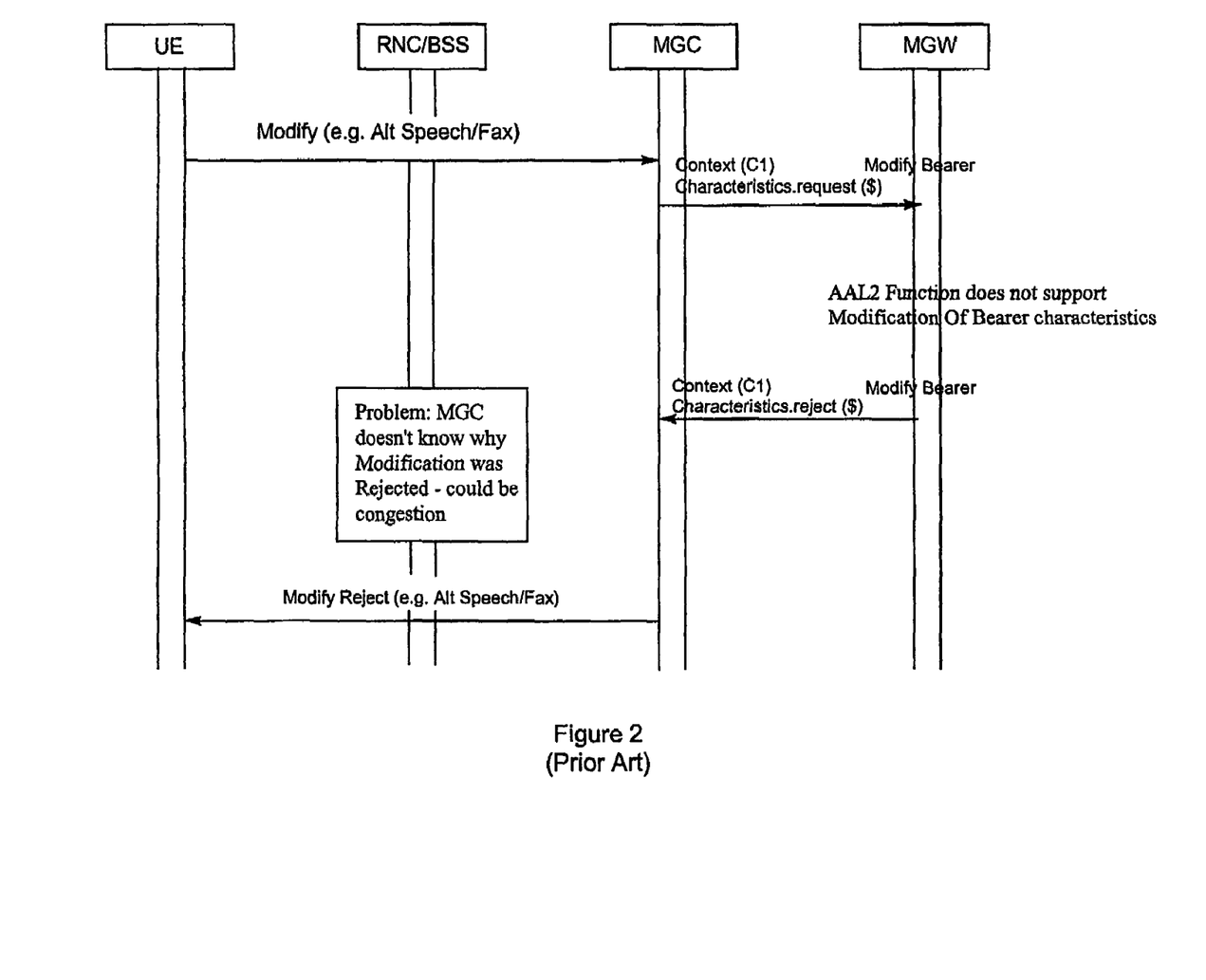
FIG. 2 schematically illustrates the issuance of a request for a modification to bearer characteristics and the generation of an error message from a bearer control functionality in accordance with a prior art system.

With reference to FIG. 2, the issuance of a request for a modification to bearer characteristics and the generation of an error message from a media gateway is schematically illustrated. In the instance of FIG. 2, the establishment, modification and release of bearers are effected via the media gateway control protocol H.248/Megaco. Other examples of vertical control protocols that are equally applicable for such signalling are Internet Device Control Protocol IDCP or the MGCP protocol. Typically, a media gateway controller (MGC) is not aware of the Bearer Control Protocol and even if this information is known to the controller, it is usually not aware of the precise version of the Bearer Control Protocol used. As a result, in existing systems, if a controller requests a modification of the bearer characteristics an error message is usually generated.

For example, this situation would arise where the switching and signalling protocol of the ATM Adaption Layer, Q.AAL2 CS1 is implemented on a media gateway (MG) as the protocol does not support bearer modification signalling. However, if Q.AAL2 CS2 were implemented on the media gateway (MG), the request would be successfully received as version 2 of this protocol supports bearer modification signalling. Although version 2 of the ATM switching and signalling protocol supports bearer modification signalling, receipt of an error message indicating the failure of a requested bearer modification would not indicate to the media gateway controller that the error was due to the lack of support of bearer modification signalling. As a result, irrespective of the reason for the error, the media gateway controller would take action on receipt of a generic error and would usually disconnect the call.

Figure 3:
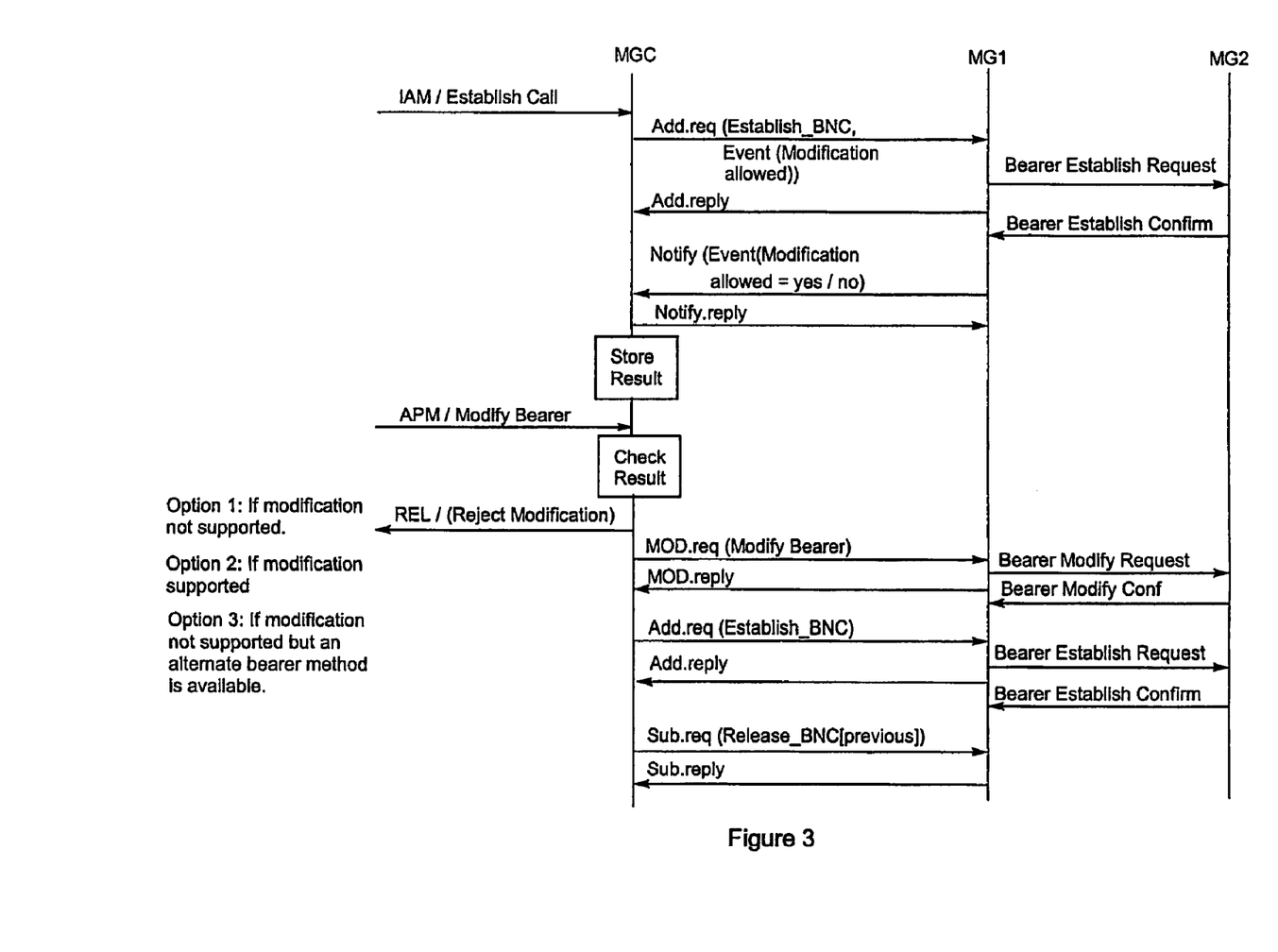
FIG. 3 schematically illustrates an example call message flow showing the request and receipt of a modification Allowed Event at a call establishment in accordance with a preferred embodiment of the present invention.

FIG. 3 shows an example call message flow according to a preferred embodiment of the invention showing the request and receipt of a modification Allowed Event at a call establishment. A call control message is received at the MGC requesting that a new call be established. The MGC then requests MG1 to establish a new bearer connection through the use of an ADD.request message. In this example, the MGC is acting as a call controller and MG1 is acting as a bearer controller. In the same message the MGC requests an event so that the MG can indicate whether modification of bearer characteristics is allowed or not. MG1 establishes a bearer using bearer control messaging. On receipt of confirmation of bearer establishment, MG1 will send a Notify message to the MGC indicating whether or not the bearer characteristics can be modified. The MGC will store this indication for use at a later time.

When a call control message is received indicating that the bearer characteristics should be modified, the MGC checks the stored indication and then performs one of the following actions:

1. If bearer characteristic modification is not supported—the MGC rejects the call control modification through the use of call control signalling.
2. If bearer characteristic modification is supported—the MGC requests MG1 to modify a bearer characteristic through the use of a MOD.request. MG1 then uses the applicable bearer control signalling to modify the bearer characteristic.
3. If bearer characteristic modification is not supported but an alternate bearer is available—the MGC requests MG1 to establish a new bearer connection through the use of an ADD.request message. In this instance, MG1 establishes a bearer using bearer control messaging. The MGC then requests MG1 to subtract the previously established bearer using a Sub.request message. This subtract message leads to Bearer control release messages or a message prior to the sub.request message requests the sending of bearer control release messages.

Figure 4:
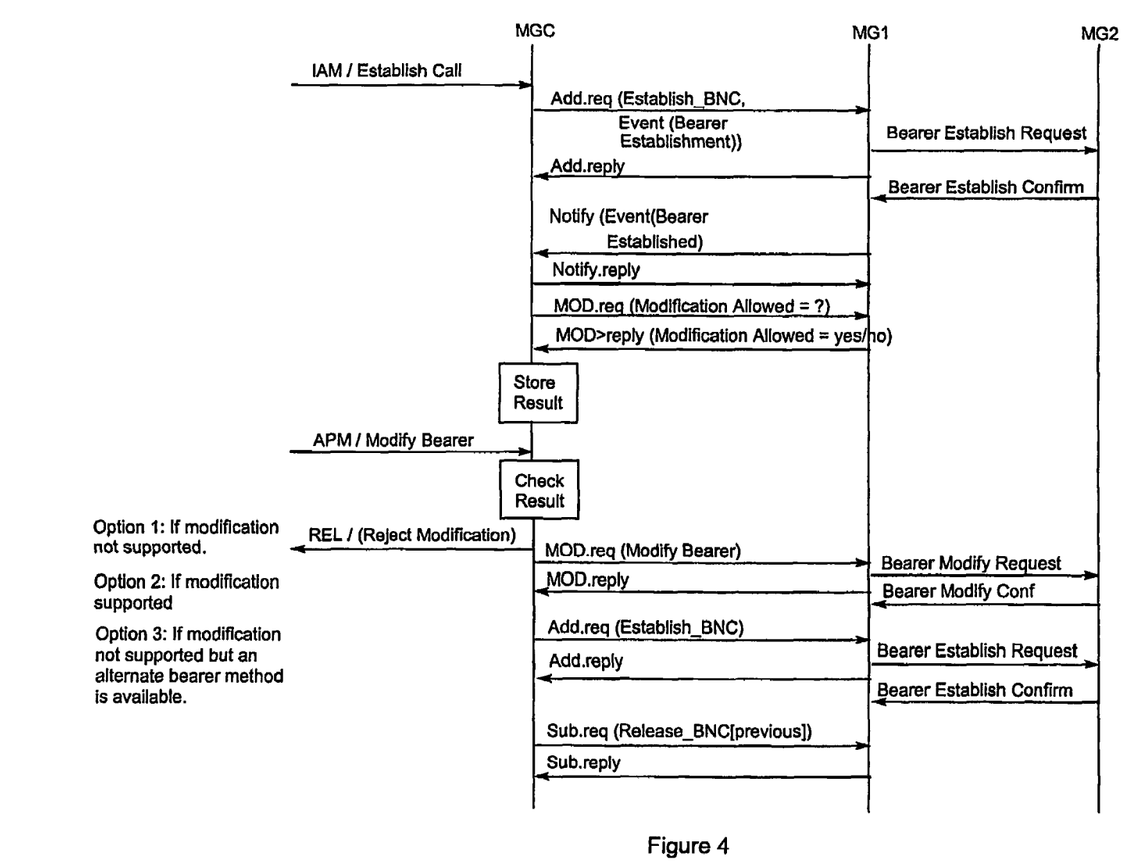
FIG. 4 schematically illustrates an example call message flow showing the request and receipt of a Modification Allowed Property after bearer establishment in accordance with another preferred embodiment of the present invention.

FIG. 4 shows an example call message flow showing the request and receipt of a Modification Allowed Property after bearer establishment according to a preferred embodiment of the invention. A call control message is received at the MGC indicating that a new call should be established. The MGC then requests MG1 to establish a new bearer connection through the use of an ADD.request message. Again, for this example, the MGC is acting as a call controller and MG1 is acting as a bearer controller. In the same message the MGC requests an event so that MG1 can indicate when the bearer is established. MG1 establishes a bearer using bearer control messaging. On receipt of confirmation of bearer establishment, MG1 will send a Notify message to the MGC indicating that the bearer is established.

On, or subsequent to, the receipt of the notification that the bearer is established, the MGC will send a MOD.request with a modification confirmation property asking MG1 to choose a value for it. MG1 then determines if the bearer characteristics can be modified and returns the appropriate value (yes/no) in the MOD.response message. The MGC stores this indication for future use.

When a call control message is received indicating that a bearer characteristic should be modified, the MGC checks the stored indication and then performs one of the following actions:

1. If bearer characteristic modification is not supported—the MGC rejects the call control modification through the use of call control signalling.
2. If bearer characteristic modification is supported—the MGC requests MG1 to modify a bearer characteristic through the use of a MOD.request. The MGC then uses the applicable bearer control signalling to modify the bearer characteristic as required.
3. If bearer characteristic modification is not supported but an alternate bearer is available—the MGC requests MG1 to establish a new bearer connection through the use of an ADD.request message. In this instance, MG1 establishes a bearer using bearer control messaging. The MGC then requests MG1 to subtract the previously established bearer using a Sub.request message. This subtract message leads to Bearer control release messages or a message prior to the sub.request message requests the sending of bearer control release messages.

Figure 5:
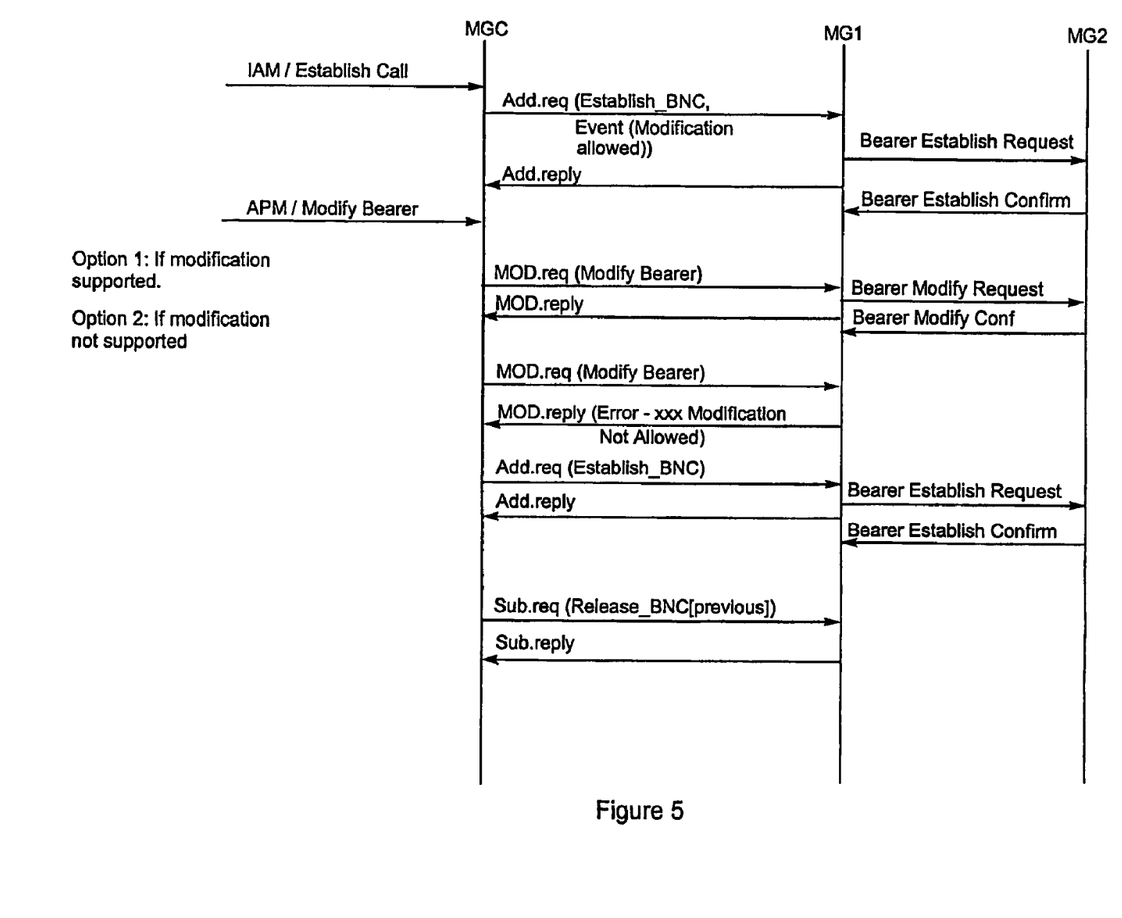
FIG. 5 schematically illustrates an example call message flow showing the receipt of an Error Code in accordance with a further preferred embodiment of the present invention.

FIG. 5 shows an example call message flow showing the receipt of an Error Code in accordance with a preferred embodiment of the invention. A call control message is received at the MGC indicating that a new call should be established. The MGC then requests MG1 to establish a new bearer connection through the use of an ADD.request message. Once again, the MGC is acting as a call controller and MG1 is acting as a bearer controller. MG1 establishes a bearer using bearer control messaging.

When a call control message is received indicating that a bearer characteristic should be modified, the MGC requests MG1 to modify the bearer characteristic through the use of a MOD.request.

1. If bearer characteristic modification is supported—MG1 rejects the message with an error code indicating that "bearer characteristic modification is not allowed" and send this in a MOD.reply message.
2. If bearer characteristic modification is not supported—MG1 then uses the applicable bearer control signalling to modify a bearer characteristic as required.

If an error code is received indicating that bearer characteristic modification is not a capability of MG1, but an alternate bearer is available—the MGC requests the MG to establish a new bearer connection through the use of an ADD.request message. MG1 establishes a new bearer using bearer control messaging. The MGC will then request MG1 to subtract the previously established bearer using a Sub.request message. This subtract message leads to Bearer control release messages or a message prior to the sub.request message requests the sending of bearer control release messages.

Figure 6:
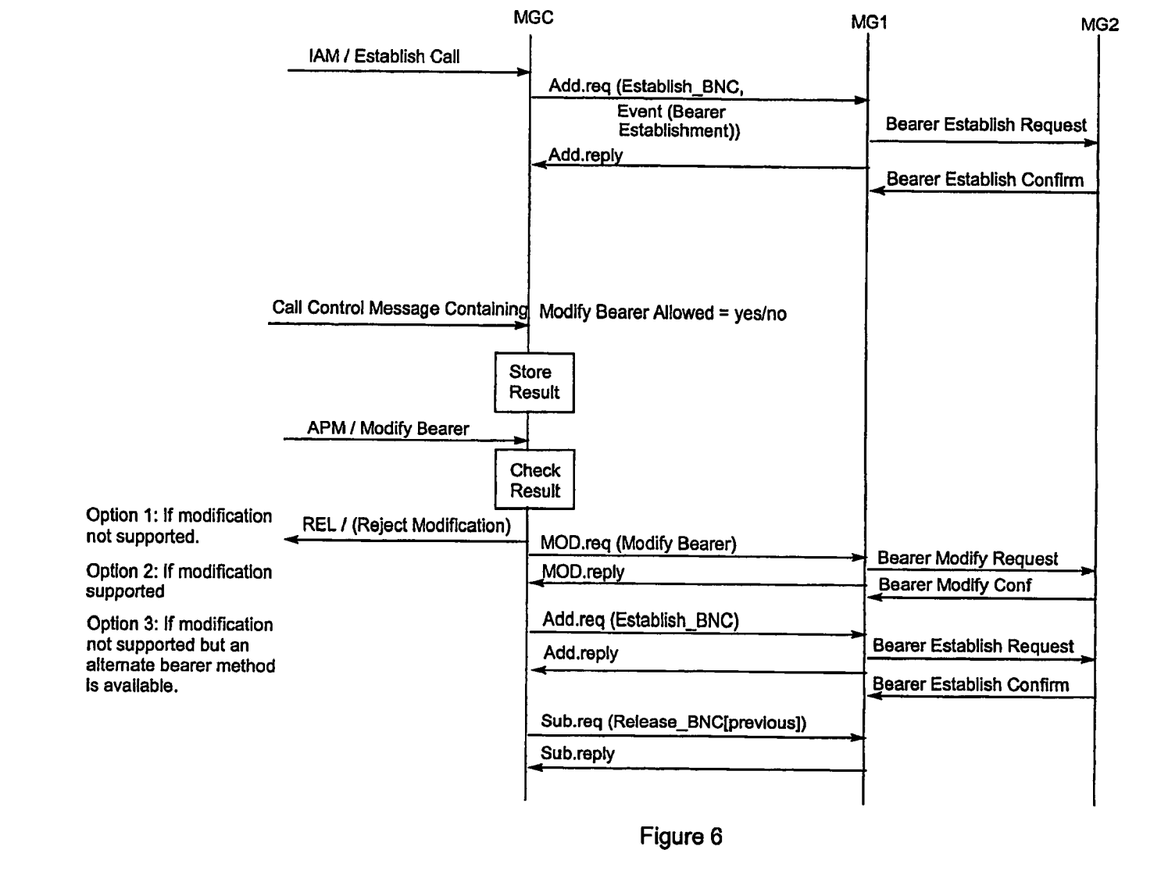
FIG. 6 schematically illustrates an example call message flow showing the request and receipt of a Modification Allowed in a call control message after bearer establishment in accordance with yet another preferred embodiment of the present invention.

FIG. 6 shows an example call message flow showing the request and receipt of a Modification Allowed in a call control message after bearer establishment according to a preferred embodiment of the invention. A call control message is received at the MGC indicating that a new call should be established. The MGC then requests MG1 to establish a new bearer connection through the use of an ADD.request message. Yet again, the MGC is acting as a call controller and MG1 is acting as a bearer controller. MG1 establishes a bearer using bearer control messaging.

When a call control message is received indicating that a bearer characteristic should be modified the MGC checks the stored bearer characteristic modification allowed indication in the stored call control messages and then performs one of the following actions:

1. If bearer characteristic modification is not supported—the MGC rejects the call control modification request through the use of call control signalling.
2. If bearer characteristic modification is supported—the MGC requests MG1 to modify a bearer characteristic through the use of a MOD.request message. The MGC then uses the applicable bearer control signalling to modify the bearer characteristic as required.
3. If bearer characteristic modification is not supported but an alternate bearer is available—the MGC requests MG1 to establish a new bearer connection through the use of an ADD.request message. MG1 establishes a bearer using bearer control messaging. The MGC then requests MG1 to subtract the previously established bearer using a Sub.request message. This subtract message leads to Bearer control release messages or a message prior to the sub.request message requests the sending of bearer control release messages.

Figure 7:
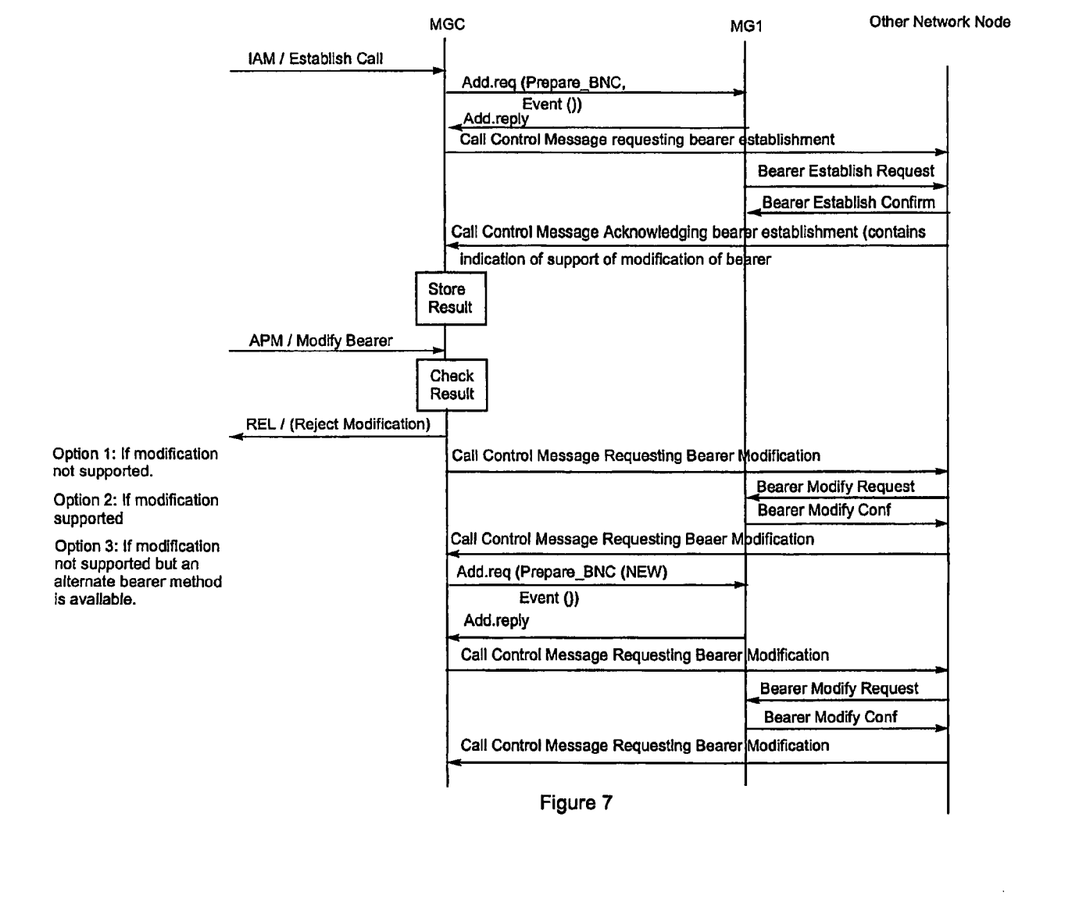
FIG. 7 schematically illustrates an example call message flow showing the request and receipt of a Modification Allowed in a call control message after bearer establishment wherein the bearer is established by another network entity in accordance with still another preferred embodiment of the present invention.

FIG. 7 schematically illustrates an example call message flow showing the request and receipt of a Modification Allowed in a call control message after bearer establishment wherein the bearer is established by another network entity residing in a node other than MG1. In particular, in FIG. 7 the bearer is established by another network entity under request from a Call Control Server via Call Control Signalling and illustrates yet another embodiment of the invention.

With reference to FIG. 7, a call control message is received at the MGC indicating that a new call should be established. The MGC then requests MG1 to prepare a new bearer connection through the use of an ADD.request message. The MGC then requests the bearer to be established by the other network node via a call control protocol. In the response to the request for bearer establishment an indication is returned to MGC as to whether subsequent modifications to the bearer characteristics may be made.

When a call control message is received indicating that a bearer characteristic should be modified, the MGC checks the bearer modification allowed indication returned in the call control messages at bearer establishment and then performs one of the following actions:

1. If bearer characteristic modification is not supported—the MGC rejects the call control modification through the use of call control signalling.
2. If bearer characteristic modification is supported—the MGC requests MG1 to modify the bearer characteristic through the use of a MOD.request message. Alternatively, the MGC uses appropriate call control signalling to request the other network node to perform the bearer characteristic modification.
3. If bearer characteristic modification is not supported but an alternate bearer is available—the MGC requests the MG1 to prepare a new bearer connection through the use of an ADD.request message. The MGC then requests a bearer characteristic modification to the new bearer connection endpoint from the other network node via call control signalling. The MGC then requests MG1 to subtract the previously established endpoint using a Sub.request message, not detailed herein. This subtract message leads to Bearer control release messages or a message prior to the sub.request message requests the sending of bearer control release messages.

It is to be understood that the preferred embodiments illustrated in FIGS. 3 to 7 do not limit the messages that could be used to provide indications as to the capability of a bearer controller to modify a bearer characteristic. For example, the modification of a bearer characteristic may be requested in a MOV.request and not in a MOD.request, and the request for an indication may be in a MOD.req rather than an ADD.req.

Embodiments of the invention are suited to fixed and/or mobile telecommunication systems, particularly $3^{rd}$ Generation or 3GPP networks complying with the ETSI 3GPP R4 standards release.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims.

The invention claimed is:

1. A method of managing a call in a telecommunication system, the system including a network having at least one call controller effecting a call control function and at least one bearer controller effecting a bearer control function, the at least one call controller and the at least one bearer controller being separated by a vertical control protocol interface, the method including the steps of:
   providing in at least one message, communicated within the telecommunication system from the at least one bearer controller to the at least one call controller, an indication of the capability of the at least one bearer controller to modify a characteristic of a bearer; and
   storing said indication in the at least one call controller; and
   checking said stored indication when a call control message is received by the at least one call controller indicating that the characteristic of the bearer should be modified to determine whether the characteristic of the bearer can be modified.

2. A method as claimed in claim 1 wherein the indication relates to the capability of the at least one bearer controller to modify a characteristic of a bearer during the active phase of a call.

3. A method as claimed in claim 2 wherein said at least one message is a Media Gateway Control Protocol Message.

4. A method as claimed in claim 3 wherein said at least one message includes an error code, said error code indicating the lack of the capability of the at least one bearer controller to modify a characteristic of a bearer.

5. A method as claimed in claim 4 wherein said at least one message is invoked by an event defined in a protocol extension package.

6. A method as claimed in claim 4 wherein said at least one message includes a property defined in a protocol extension package.

7. A method as claimed in claim 6 wherein said at least one message is provided during call establishment.

8. A method as claimed in claim 7 wherein said at least one message is included in a call control signalling procedure, the call control signaling procedure including a request for bearer establishment.

9. A method as claimed in claim 8, wherein said at least one message is a Radio Access Network control message.

10. A method as claimed in claim 6, wherein said at least one message is provided during an active phase of a call.

11. A method as claimed in claim 10, wherein during an active phase of a call, a request to modify an existing bearer characteristic is received by a call controller, the method further including the steps of:
    retrieving indications, for a bearer controller of the existing call, as to the capability of that bearer controller to modify a characteristic of a bearer and in an attempt to satisfy the request,
    when the bearer controller includes a capability of bearer characteristic modification signalling, invoking a modification of a bearer characteristic of the existing bearer;
    when the bearer controller does not include a capability of bearer characteristic modification signalling, invoking establishment of an alternative bearer having required bearer characteristics.

12. A method according to claim 11, wherein in the event the request cannot be satisfied, a message is communicated rejecting the request.

13. A telecommunication system including a network having at least one call controller effecting a call control function and at least one bearer controller effecting a bearer control function, the call controller and the bearer controller separated by a vertical control protocol interface, said system being operable to acquire information, from at least one message communicated within said system, relating to the capability of the at least one bearer controller to modify a characteristic of a bearer during an active phase of a call, the system also being operable to receive a request to modify a bearer characteristic during an active phase of a call, said system including:
    a first means for retrieving said acquired information to determine whether the request can be satisfied;
    a second means for modifying a bearer characteristic of an existing bearer when the at least one bearer controller includes a capability of bearer characteristic modification signalling; and
    a third means for selecting at least one of a plurality of bearers having required bearer characteristics when the at least one bearer controller does not include a capability of bearer characteristic modification signalling;
    wherein upon determination by said first means that a request can be satisfied, the second and third means are used to satisfy the request.

14. A media gateway controller being operable to:
    request, receive, and store indications, from at least one media gateway, of the capability of the at least one media gateway to modify a characteristic of a bearer established by the at least one media gateway;
    receive a call control message indicating that the characteristic of the bearer should be modified; and
    check said stored indication to determine whether the characteristic of the bearer can be modified.

15. A media gateway controller as claimed in claim 14, wherein the media gateway controller is operable to receive requests for an indication of the capability of the at least one media gateway to modify a characteristic of a bearer established by the media gateway.

16. A media gateway controller as claimed in claim 15, wherein the indication relates to the capability of the at least one media gateway to modify a characteristic of a bearer during the active phase of a call.

17. A media gateway controller as claimed in claim 16 wherein, indications are communicated in messages, said messages including an error code, said error code indicating a lack of capability of the at least one media gateway to modify a characteristic of a bearer established by the at least one media gateway.

18. A media gateway controller as claimed in claim 16 wherein, indications are communicated in messages, said messages being invoked by an event defined in a protocol extension package.

19. A media gateway controller as claimed in claim 16 wherein, indications are communicated in messages, said messages including a property defined in a protocol extension package.

* * * * *